United States Patent
Wessel (10) Patent No.: US 8,407,841 B2
(45) Date of Patent: Apr. 2, 2013

(54) DOCK LEVELER BLANKET APPARATUS AND METHODS

(76) Inventor: Paul Wessel, Delano, MN (US)

( * ) Notice: Subject to any disclaimer, the term of this patent is extended or adjusted under 35 U.S.C. 154(b) by 293 days.

(21) Appl. No.: 12/773,637

(22) Filed: May 4, 2010

(65) Prior Publication Data

US 2010/0319143 A1 Dec. 23, 2010

Related U.S. Application Data

(60) Provisional application No. 61/268,839, filed on Jun. 17, 2009.

(51) Int. Cl.
*E01D 1/00* (2006.01)
(52) U.S. Cl. .......................................................... 14/71.1
(58) Field of Classification Search .................. 14/71.1, 14/71.3; 160/368.1, 128
See application file for complete search history.

(56) References Cited

U.S. PATENT DOCUMENTS

| | | | | |
|---|---|---|---|---|
| 1,352,733 A * | 9/1920 | Egerton | ............. | 428/45 |
| 4,468,910 A * | 9/1984 | Morrison | ............. | 52/591.2 |
| 4,675,225 A * | 6/1987 | Cutler | ............. | 428/74 |
| 4,682,268 A | 7/1987 | Okano | | |
| 4,682,382 A | 7/1987 | Bennett | | |
| 4,682,676 A | 7/1987 | Murata | | |
| 5,016,391 A * | 5/1991 | Miller et al. | ............. | 49/70 |
| 5,442,825 A * | 8/1995 | Hahn et al. | ............. | 14/71.1 |
| 6,205,721 B1 | 3/2001 | Ashelin | | |
| 6,718,716 B2 * | 4/2004 | Cowie | ............. | 52/404.1 |
| 7,146,673 B1 | 12/2006 | Digmann | | |
| 7,334,281 B2 | 2/2008 | Digmann | | |
| 2004/0055819 A1* | 3/2004 | Lynn et al. | ............. | 182/46 |
| 2005/0199357 A1* | 9/2005 | Dunn | ............. | 160/370.22 |
| 2007/0101517 A1 | 5/2007 | Digmann | | |
| 2008/0127435 A1* | 6/2008 | Maly et al. | ............. | 14/71.1 |
| 2008/0295434 A1* | 12/2008 | Bills | ............. | 52/506.01 |
| 2010/0251654 A1* | 10/2010 | Paul | ............. | 52/506.05 |
| 2011/0010871 A1* | 1/2011 | Metz et al. | ............. | 14/69.5 |
| 2011/0079674 A1* | 4/2011 | Prochnow et al. | ......... | 242/390.2 |

* cited by examiner

*Primary Examiner* — Thomas B Will
*Assistant Examiner* — Abigail A Risic (57) ABSTRACT

A thermal barrier system for a dock leveling system includes an insulative blanket is dimensioned to be larger than the ramp plate of a dock leveler system at a loading dock. The insulative blanket is removably attached to at least a portion of the door when positioned over the ramp plate. The insulative blanket can be attached to the door when the door opens, lifting the blanket out of the way during loading and unloading operations.

17 Claims, 8 Drawing Sheets

DOCK LEVELER BLANKET APPARATUS AND METHODS

CROSS REFERENCE TO RELATED APPLICATIONS

This application claims the benefit of the filing date of U.S. Provisional Patent Application Ser. No. 61/268,839 filed Jun. 17, 2009.

FIELD OF THE INVENTION

The present inventions relates to a dock leveler blanket apparatus and methods for installing and using the dock leveler blanket.

BACKGROUND

A typical loading dock of a building includes an outside doorway with an elevated platform that is used by load lift and extraction devices from loading or removing from semi truck trailers. There are many different vertical height differences between the stationary building loading platform and the entrance into the bed of the transport trailer. To compensate for these vertical height differences an instrument known as a dock leveler system is utilized. A typical dock leveler device includes a ramp and an extension plate that bridges the gap between the rear of the truck trailer and the loading deck of the warehouse. The extension plate extends into the bed of the truck. The extension plate and ramp allow personnel and material handling equipment to readily move in and out of the vehicle as the truck is loaded or unloaded.

The mechanism associated with a dock leveler system is placed in a well or depression in the floor near a loading dock door in a warehouse, factory, retail store or the like. The ramp and the extension plate and internal mechanism to raise and lower the ramp and extension plate are stored within the depression or well. When not in use, the ramp and extension plate are essentially flush with the floor. When a truck arrives for loading or unloading, a mechanism generally housed within the well or depression raises the ramp and the extension plate to a position above the bed of the truck, then moves a portion of the ramp and extension plate over the bed of the truck, and then lowers the ramp and extension plate onto the bed of the truck to form the bridge between the bed of the truck and the floor near the dock leveler apparatus.

The ramp and extension plate as well as the mechanism to raise and lower the ramp must be sufficiently strong to support a fork lift and other personnel used to load or unload a trailer. Steel is generally used to form the ramp, the extension plate, and at least portions of the mechanism used to raise and lower the ramp and extension plate. Steel is sufficiently strong to support the loads. The mechanism to raise and lower the ramp does not fill the well or depression. There is plenty of open space in the well or depression. The well or depression is also generally open and exposed to the elements.

Dock levelers provide a huge advantage in that they can accommodate many levels of trucks and trailers to ease loading and unloading from these vehicles. However, dock levelers also have disadvantages. There are two ways to lose heat. One is by convection or the movement of air. The other is by conduction or how the material conducts heat or cold. In addition to being strong, steel has an unfortunate characteristic in that steel is a very good conductor of thermal energy. The result is that when there is a difference in temperature between the outside and the inside, the metal associated with the dock leveler conducts heat to change the temperature inside the warehouse warmer in the summer and cooler in the winter. In the case of cold storage, the cold space is made warmer. The structure associated with the dock leveler leaves a depression or well with plenty of open space. This space does nothing to stop the flow of air so there is additional thermal loss via convection. All in all, the dock leveler is akin to having an uninsulated space in a wall of your home. Although the metal ramp is a solid piece that inhibits or stops most of the wind, there is still air that travels through the space to rob heat from the warehouse through the dock leveler. In addition, the steel conducts heat to produce further heat loss or thermal transfer. In fact, in many applications people note that it is both cold and drafty near a dock leveler. Of course, the same thing can happen when it is warm outside and cool on the inside, such as when a dock leveler is at a cold storage facility.

To help shield against adverse weather conditions a number of difference shielding mechanisms have been developed. Most of these shielding mechanisms have been developed to create a weather retardant barrier around the perimeter of the delivery truck's trailer. This is mainly around the doorway of the warehouse, the back of the delivery truck, and the space in between. The barrier slows heat loss from convection. The weather retardant barrier, in many instances, is a shroud between the building and the truck and prevents the elements (wind, water, and snow) from directly entering either the truck or the building. Many other different approaches for shielding external adverse weather conditions have been developed and have been applied to the areas above the dock leveling system while the dock leveling system is being used and trucks are being loaded and unloaded. However, little emphasis has been given to applying similar weather-retardant strategies to the underside of the dock leveling system. Even less emphasis has been given to preventing heat loss through the dock leveling system when the system is not in use. The opening near the dock leveling system is covered by a door akin to a garage door that can be pulled up along tracks with the aid of springs and cables, and which is stored above the dock when the door is open. These doors typically have to be rugged and are also typically great conductors of heat and cold, and allow air infiltration such that heat is lost via convection.

As mentioned previously, the volume or area below the ramp and extension plate is particularly vulnerable to outside air penetration and without some type of shielding mechanism, introduces a series of adverse effects not only to the dock leveler system itself but also to the building structure which houses the dock leveling system. Secondary adverse effects of not shielding underneath the dock leveling system are experiencing an increase in building temperature fluctuations that lead to higher compensation costs as well as possible negative impact to temperature sensitive products. Tertiary adverse effects could be the introduction of high, uncontrolled humidity levels, which in turn could foster bacteria growth. This is particularly undesirable in food and pharmaceutical manufacturing.

When not in use, the ramp of the dock leveling system and the attendant mechanism is tucked into a depression in the warehouse floor near the door associated with the loading dock. The ramp and the related mechanism within the depression, generally will conduct heat and also allow air to pass into the warehouse or storage space near the dock leveling system. The door near the dock leveling system is also prone to conducting heat and allowing air infiltration. The air infiltration though the door allows heat loss through convection while conducting heat loses heat via conduction.

These heat losses, make the area near the door to the warehouse and near the dock loading system cold and drafty. In an air conditioned storage facility or in a cold storage warehouse, heat may be entering the warehouse near these areas. In either situation, money is being lost in the form of increased heating or cooling costs.

All Figures are illustrated for ease of explanation of the basic teachings of the present invention only; the extensions of the Figures with respect to number, position, relationship and dimensions of the parts to form the preferred embodiment will be explained or will be within the skill of the art after the following description has been read and understood. Further, the exact dimensions and dimensional proportions to conform to specific force, weight, strength, and similar requirements for various applications will likewise be within the skill of the art after the following description has been read and understood.

Where used in various Figures of the drawings, the same numerals designate the same or similar parts. Furthermore, when the terms "top," "bottom," "right," "left," "front," "rear," "first," "second," "inside," "outside," and similar terms are used, the terms should be understood to reference only the structure shown in the drawings and utilized only to facilitate describing the illustrated embodiments.

Figure 1:
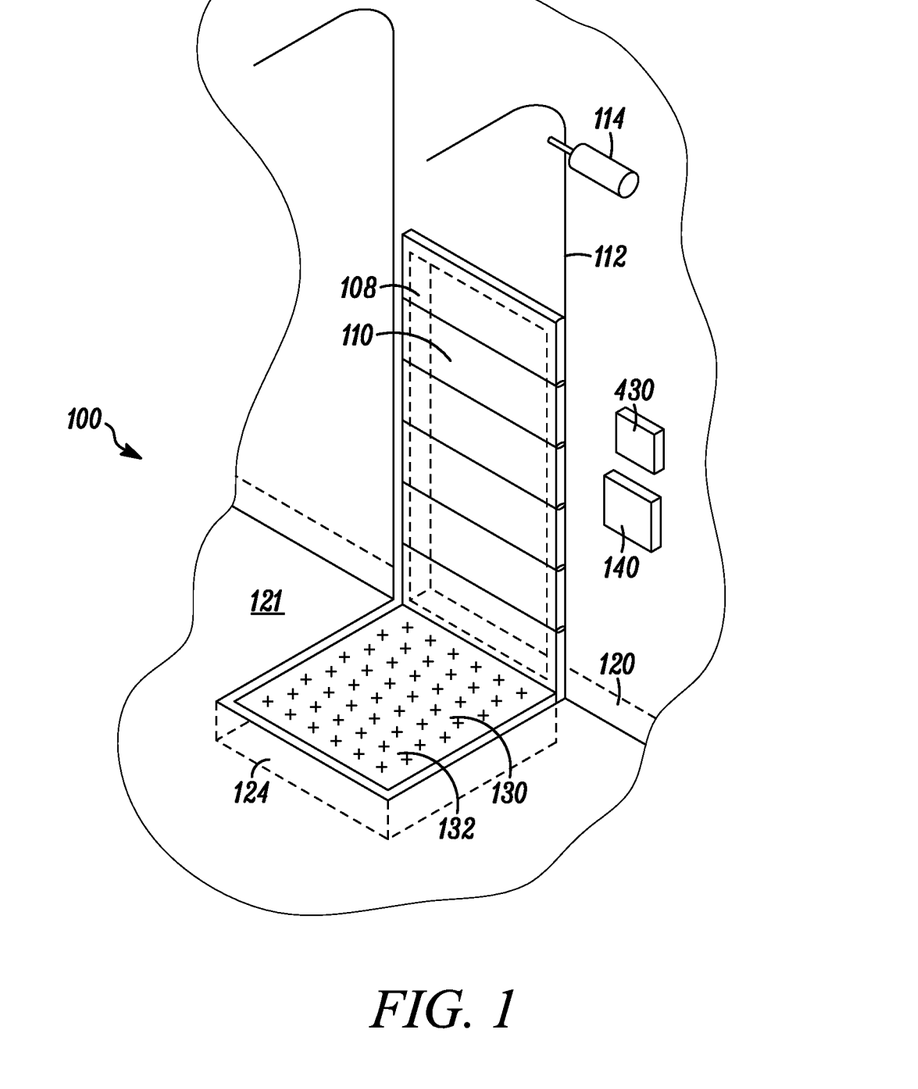
FIG. 1 is perspective view of a loading dock from the inside of a storage facility.

FIG. 1 is perspective view of a loading dock 100 from the inside of a storage facility. The loading dock 100 of a building includes an outside doorway 108 which is covered with a door 110. The floor 121 of the storage facility is also an elevated platform 120 with respect to trucks that have been backed in for unloading on ground that is well below the level of the floor 121 within the facility and below the elevated platform 120. The floor 121 that is used by load lift and extraction devices from loading or removing from semi truck trailers. The floor 121 of the storage facility extends to the exterior of the storage facility. Various trucks or other delivery vehicles back up to the loading dock by way of a surface which is lower than the elevated platform 120. There are many different vertical height differences between the stationary building loading platform or floor of the storage facility 121 and the entrance into the bed of the transport trailer.

To compensate for these vertical height differences an instrument known as a dock leveler system is utilized. A typical dock leveler device includes a moveable ramp 130 and an extension plate that bridges the gap between the rear of the truck trailer and the floor 121 of the loading deck of the warehouse. The ramp 130 travels vertically and somewhat horizontally. The ramp 130, when not in use, stows in a substantially flush position with respect to the floor 121 near the dock leveler system. The top of the ramp 130, which is visible, is called the dock plate 132. The extension plate (not shown) extends into the bed of the truck. The extension plate and ramp 130 allow personnel and material handling equipment to readily move in and out of the vehicle as the truck is loaded or unloaded.

The mechanism associated with a dock leveler system is placed in a well or depression in the floor near a loading dock 110 and the doorway 108 in a warehouse, factory, retail store or the like. The ramp 130 and the extension plate and internal mechanism to raise and lower the ramp and extension plate are stored within the depression or well 124. As mentioned previously, when not in use, the dock plate 132 associated with the ramp 130 and extension plate (not shown) are essentially flush with the floor 121. When a truck arrives for loading or unloading, a mechanism generally housed within the well or depression 124 raises the ramp 130 and the extension plate to a position above the bed of the truck, then moves a portion of the ramp and extension plate over the bed of the truck, and then lowers the ramp and extension plate onto the bed of the truck to form the bridge between the bed of the truck and the floor near the dock leveler apparatus. The mechanism within the well 124 and the dock plate 132 are generally not well insulated, so the area around the dock plate 132 many times is drafty and cold in the winter or drafty and hot in the summer. Furthermore, there is a gap between the dock plate 132 and the floor 121 to allow for clearance between the dock leveling mechanism and the walls of the depression 124 in the floor 121. This gap is prone to convection of air and the thermal loses associated with the convection. Many times the door also may not have a tight fit with respect to the exterior doorway 108. This adds to the thermal loss problem. When all is said and done, the area around the loading dock 100 is, many times, prone to thermal losses and workers feel the area is drafty.

Of course, the ramp 130 is deployed after opening the door 110. The door 110 rides on rails 112. The door 110 can have a set of cables and may be counterbalanced by a spring. Other types of door opening mechanisms are also used on loading docks, such as loading dock 100. The door 110 can also include a lifting motor 114 which can be controlled by a switch 140. In some embodiments, the lifting mechanism can include a controller for controlling the opening and closing of the door 110 based on various inputs.

Figure 2:
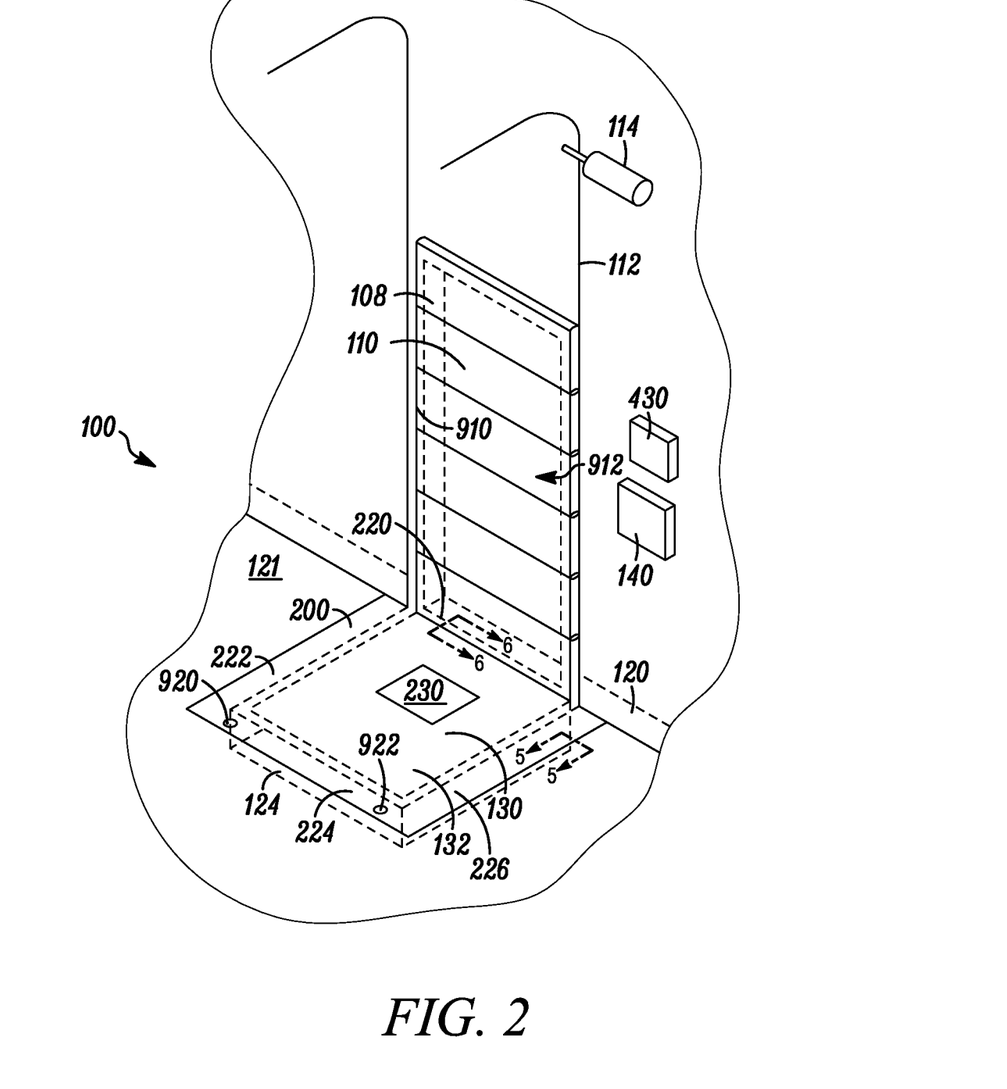
FIG. 2 is perspective view of a loading dock from the inside of a storage facility with the insulative blanket in a deployed position, according to an example embodiment.

FIG. 2 is perspective view of a loading dock 100 from the inside of a storage facility with the insulative blanket 200 in a deployed position, according to an example embodiment.

With the insulative blanket 200 added to the loading dock 100 location, a thermal barrier system 210 for a dock leveling system 130 is formed. The thermal barrier system 210 includes a ramp plate 132 associated with the dock leveling system 130 which is substantially flush to a floor of a storage facility when in a stowed position (shown in FIG. 1 and shown in phantom in FIG. 2). The system 210 also includes the door 110 near the dock leveling system 130. The door 110 has a closed position, and an open position. The door 110 is closed when the loading dock is not in use and liftable to an open position over the dock leveling system 130 when loading or unloading a delivery vehicle. Of course, the door 110 could also be lifted for other reasons, such as airing out the storage facility on a periodic basis. The door 110 can be lifted using the lifting mechanism, and more specifically the lift motor 114.

As mentioned above, the system 210 includes the insulative blanket 200. It should be noted that the insulative blanket 200 could also be termed a floor mat, or an insulative floor mat. The insulative blanket 200 is dimensioned to be larger than the ramp plate 130. In fact, the insulative blanket 200 is dimensioned to cover the deck plate 132, a gap between the ramp plate and a portion of the floor 121 of the storage facility near a depression 124 in which the dock leveling system is housed. The insulative blanket 200 is removably attached to at least a portion of the door 110 when positioned over the ramp plate 132. In one embodiment, one portion 210 of a hook and loop fastener is attached to the door 110 and another portion 212 of the hook and loop fastener attached to an edge 220 of the insulative blanket 200 (shown in FIGS. 6 and 7). The portions of the hook and loop fastener 210, 212 separate from one another when a selected weight is positioned on the insulative blanket 200. The weight selected is generally the weight associated with one human. In this embodiment, if a person is standing on the insulative blanket when the door begins to open, the insulative blanket 200, and more specifically the hook and loop fastener portions 210, 212 (shown in FIGS. 6 and 7) tears away from each other to prevent toppling the human. This is one safety feature associated with this blanket.

The insulative blanket 200 also includes signage 230 on a visible portion of the insulative blanket. The sign 230 on the visible portion of the insulative blanket 200 will generally be "No Step" for indicating to workers that they are not to step on the insulative blanket. The sign 230 could also include advertising or some other message.

Figure 3:
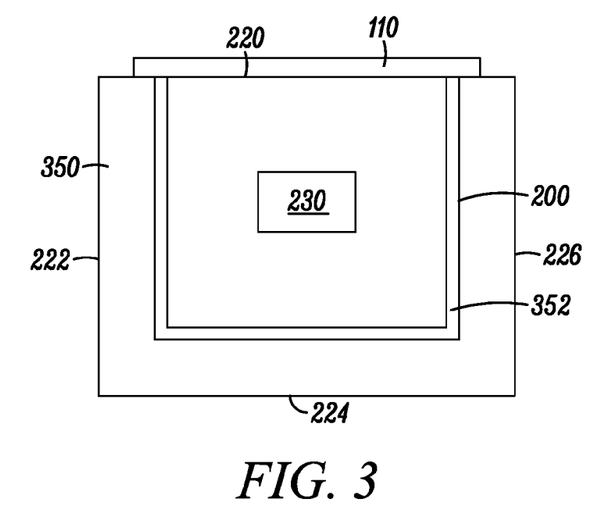
FIG. 3 is a top view of the insulative blanket that includes thermochromatic material, according to an example embodiment.

FIG. 3 is a top view of the insulative blanket 200 that includes thermochromatic material 350, according to an example embodiment. In some embodiments, the insulative blanket 200 will include the thermochromic material 350. Thermochromic material 350 will change colors in response to the temperature at the surface of the insulative blanket 200, and more specifically, temperature of the thermochromic material 350. The thermochromic material 350 can then be viewed and monitored for unusual temperature patterns. As shown in FIG. 3, there is a band of color 352 indicative of a colder region that corresponds to the gap between the floor 121 and the dock plate 132.

Figure 4:
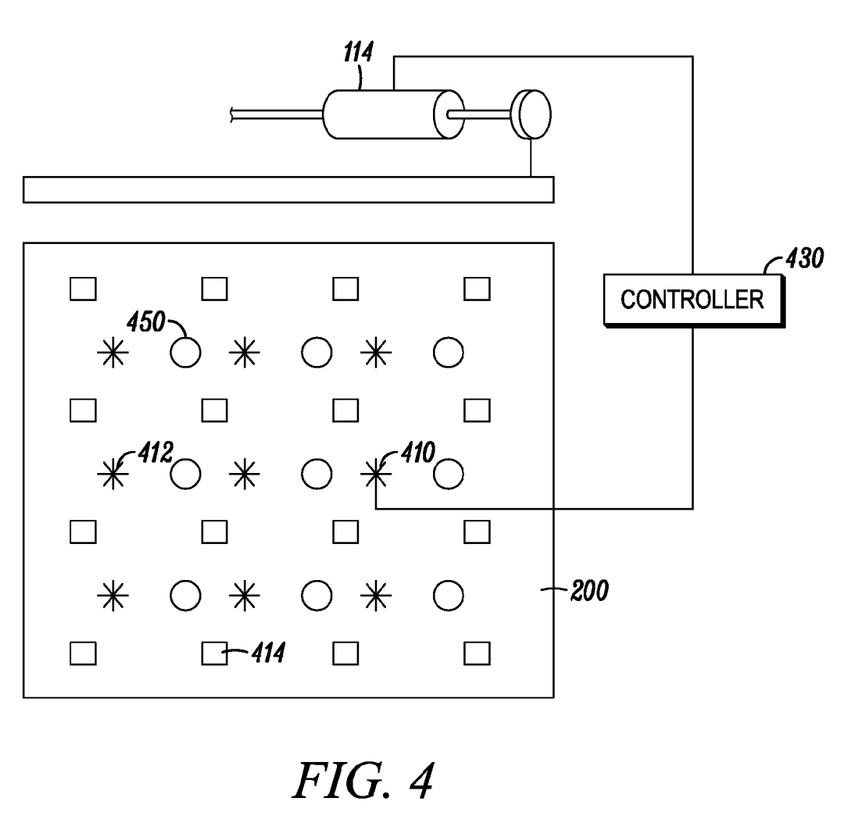
FIG. 4 is schematic view of the insulative blanket with at least one sensor and a door controller, according to an example embodiment.

FIG. 4 is schematic view of the insulative blanket 200 with at least one sensor 410 and a door controller 420, according to an example embodiment. In some example embodiments, at least one sensor 410 is associated with the insulative blanket 200. The at least one sensor 410 can be a load sensor or a temperature sensor. It is contemplated that multiple load sensors 412 or multiple temperature sensors 414 could be provided within the insulative blanket 200. It is further contemplated that in some embodiments both load sensors 412 and temperature sensors 414 could be provided. In some embodiments, the at least one sensor 410 sends a signal 432 to a controller 430 for the door 110. For example, a load sensor 412 could send a signal 432 to the door 110 in response to sensing a load. This signal 432 could be used to prevent the door 110 from opening when something is producing a load on the insulative blanket 200. The load could be a human being or a box or other item that is not supposed to be on the insulative blanket 200. Again, this is a safety feature for humans and also will prevent damage to items positioned on the inslulative blanket 200. In another embodiment, the signage 230 (shown in FIG. 2) could be lightable and a signal from the at least one sensor could enable lighting of the sign 230. FIG. 4 also shows that an array of magnets 450 could be placed in the insulative blanket. The array of magnets 450 acts to further attach the insulative blanket to the dock plate 132 (shown in FIG. 1) which is typically made of steel, a ferrous material.

Returning back to FIG. 2, a perimeter, such as perimeter 222, 224, or 226, of the insulative blanket 200, in one example embodiment, can include a grip enhancing material on the surface of the insulative blanket 200 that contacts the dock plate and the floor near the dock plate. This could be a thin strip of a light adhesive or could be an elastomeric material. It is contemplated that this material would help prevent the insulative blanket 200 from slipping. It is further contemplated that this material would also act to somewhat seal the blanket to inhibit convection of air around the insulative dock blanket. A portion of the perimeter 222, 224, 226 of the insulative blanket 200, in another embodiment, can include a weight which also would help to prevent the flow of air (convection) getting past the insulative blanket.

Figure 5:
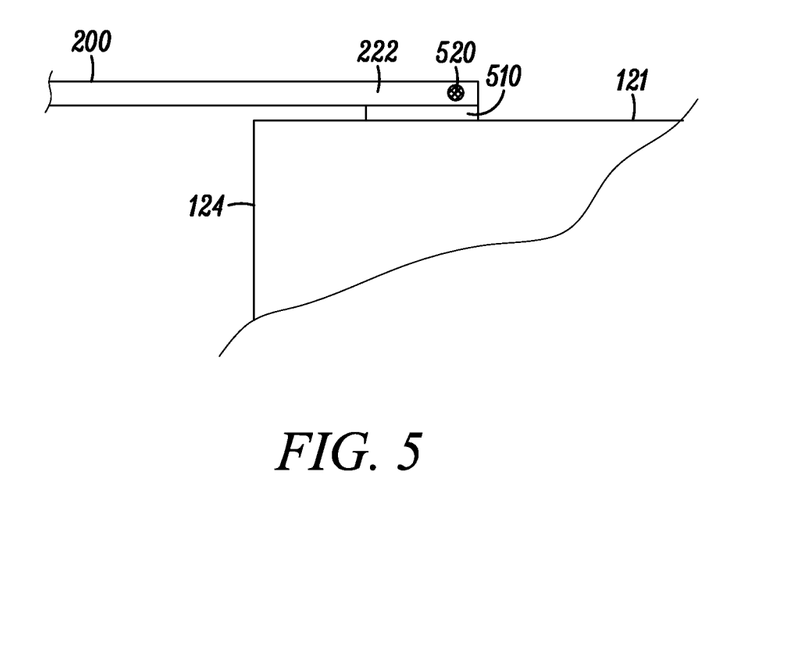
FIG. 5 is cross sectional view of the insulative blanket at one of the perimeter portions of the insulative blanket, according to an example embodiment.

FIG. 5 is cross sectional view of the insulative blanket at one of the perimeter portions 222 of the insulative blanket 200, according to an example embodiment. A perimeter portion, such as perimeter portion 222, of the insulative blanket 200 includes a grip enhancing material 510. The grip enhancing material 510 can be an elastomeric material, such as a rubber material, or could even be an adhesive material. The grip enhancing material is for preventing the edges or perimeter portions 222, 224, 226 from slipping. The grip enhancing material can also function as a seal to further cut down air flow through the dock leveler system. A portion of the perimeter 222, 224, 226 of the insulative blanket, in another embodiment, can include a weight 520 which also would help to prevent the flow of air (convection) getting past the insulative blanket. The weight can be used to produce a force between the grip enhancing material 510 and the floor 121. In other embodiments, the weight 520 could be used without the grip enhancing material 510 along one or more of the perimeters 222, 224, 226 to prevent or cut down an amount of air convection through the insulative blanket 200.

Figure 6:
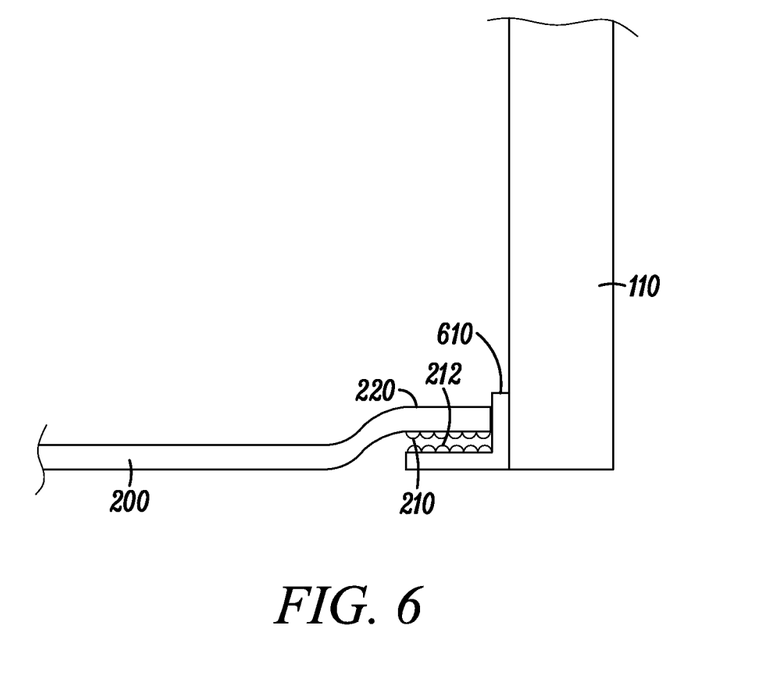
FIG. 6 is cross sectional view of the insulative blanket attached to the door along cut line 6-6 of FIG. 2, according to an example embodiment.

FIG. 6 is cross sectional view of the insulative blanket attached to the door, according to an example embodiment. This details the attachment of the perimeter portion 200 to the door 110. An L-shaped channel 610 is attached to the door 110 at a position near the bottom of the door 110. One portion 210 of the hook and loop fastener is attached to the ledge portion of the L-shaped channel 610 and the other portion 212 of the hook and loop fastener is attached to the perimeter portion 220 of the inslulative blanket 200.

Figure 7:
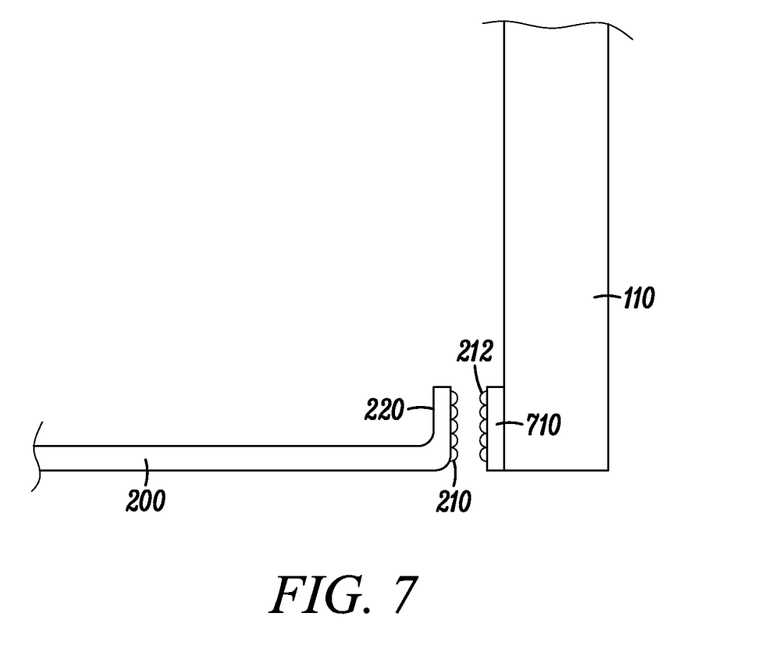
FIG. 7 is cross sectional view of the insulative blanket attached to the door along cut line 6-6 of FIG. 2, according to an example embodiment.

FIG. 7 is cross sectional view of the insulative blanket 200 attached to the door, according to another example embodiment. A flat strip 710 is attached to the door 110 at a position near the bottom of the door 110. One portion 210 of the hook and loop fastener is attached to the ledge portion of the flat strip 710 and the other portion 212 of the hook and loop fastener is attached to the perimeter portion 220 of the insulative blanket 200. If the door is sufficiently strong, the flat strip 710 can be eliminated and a portion of the hook and loop fastener can be applied directly to the door 110 at a position near the bottom of the door 110.

Figure 8:
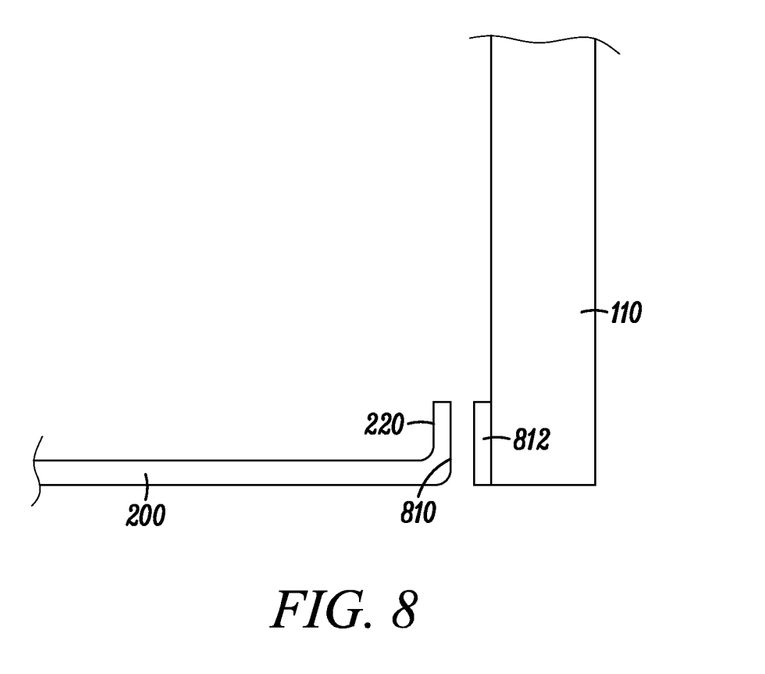
FIG. 8 is cross sectional view of the insulative blanket attached to the door, according to yet another example embodiment.

FIG. 8 is cross sectional view of the insulative blanket attached to the door, according to yet another example embodiment. In another embodiment, the system includes at least one magnet 800 attached to one of the door 110 and the blanket edge 220, and at least one portion of ferrous material 812 attached to the other of the door 110 and blanket edge 220. As shown, a flat strip 810 of ferrous material is attached to the door 110 at a position near the bottom of the door 110. The ferrous material could be a strip of iron, or steel for example. It should be noted that magnets could also be adhered to the door 110 and the perimeter portion 220 could be provided with ferrous material. In yet another embodiment, both the door 110 and the perimeter portion 220 could be provided with magnets. The separation force between the magnetic 810 and ferrous portions 812 in either the insulative blanket 200 or the door 110 is selected so that the weight of a human on the insulative blanket is greater than the separation force. Many of the doors are made of lightweight aluminum. These doors need a ferrous strip to allow magnetic attachment. Some of the doors may also need a strip that attaches to the frame portions of the door to provide a spot that is sufficiently strong to allow attachment.

Figure 9:
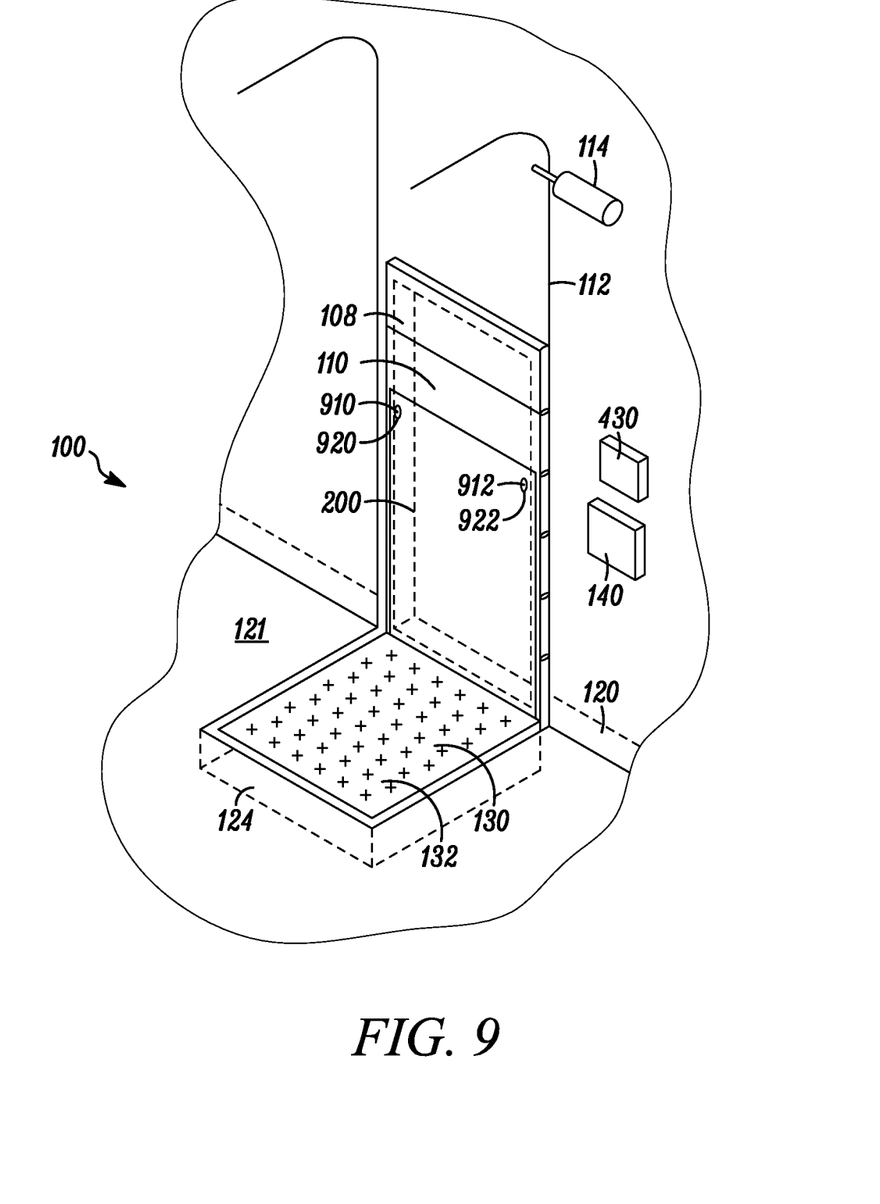
FIG. 9 is a perspective view of a loading dock from the inside of a storage facility with the insulative blanket attached to the door in the closed position, according to an example embodiment.
Figure 10:
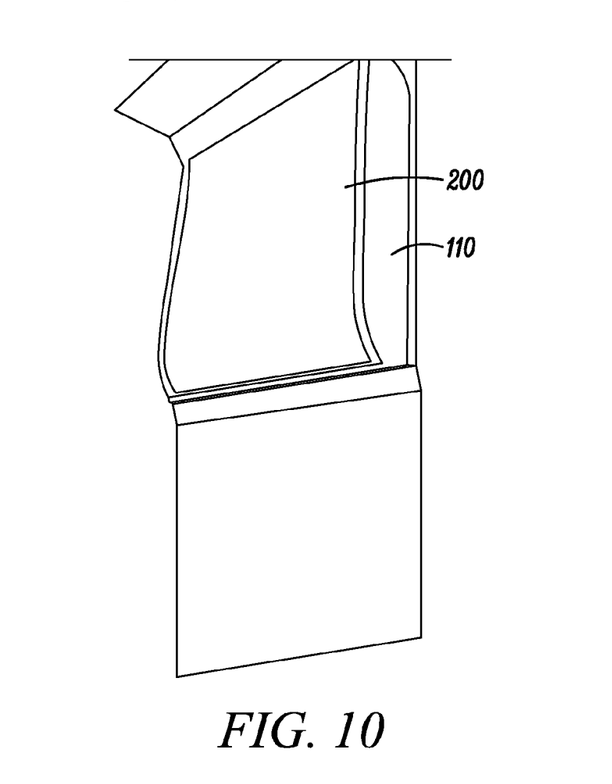
FIG. 10 is a perspective view of a loading dock from the inside of a storage facility with the insulative blanket attached to the door in an open position, according to an example embodiment

FIG. 9 is a perspective view of a loading dock from the inside of a storage facility with the insulative blanket 200 attached to the door 110 in the closed position, according to an example embodiment. FIG. 10 is a perspective view of a loading dock from the inside of a storage facility with the insulative blanket 200 attached to the door 110 in an open position, according to an example embodiment. FIGS. 9 and 10 show one embodiment of a retraction apparatus 900 associated with the thermal barrier system. The insulative blanket retraction apparatus 900 includes a first fastener and a second fastener attached to the door. The fastener can be any suitable fastener. As shown in FIGS. 9 and 10, the fastener is a first hook 910 attached to a first edge of the door, and a second hook 912 attached to a second edge of the door. The first hook 910 and the second hook 912 are positioned a distance away from a bottom portion of the door 110. The edge 224 of the insulative blanket opposite the edge 220 removably attached to the door 110 includes at least a first opening 920 and a second opening 922. The first opening 920 is dimensioned to receive the first hook 910 and the second opening 922 is dimensions to receive the second hook 912. The insulative blanket 200 can be removed from the floor by hooking the insulative blanket 200 to the door 110, using hooks 910, 912 and openings 920, 922 in the insulative blanket 200. When the door is opened, the hooks 910, 912 and openings 920, 922 at one edge or perimeter 224 attach edge or perimeter portion 922 while the edge or perimeter portion 220 remains attached near the bottom of the door. Opening of the door 110 will bring the insulative blanket 200 along with the door as it is being opened, as shown in FIG. 10. When in the retracted position, the insulative blanket 200 also acts to further insulate the door 110.

Figure 11:
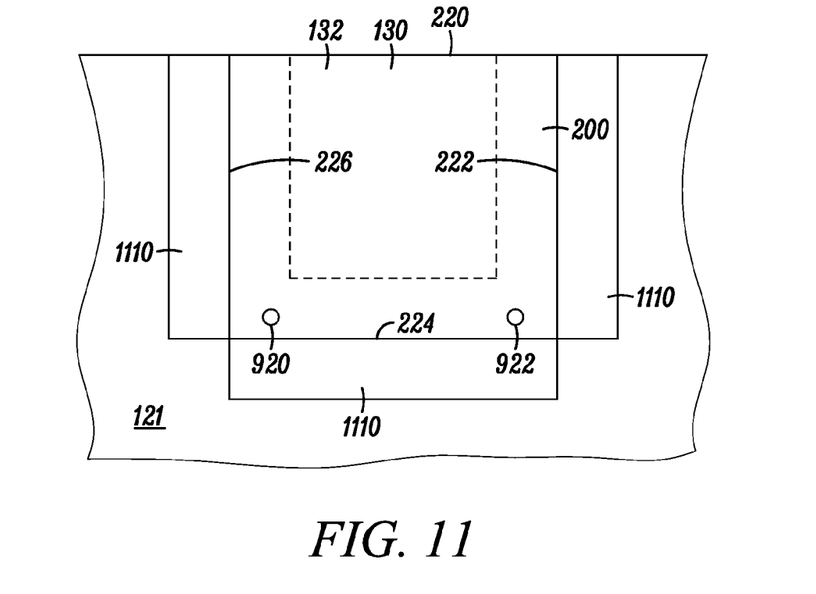
FIG. 11 is top view of the insulative blanket having an extension attached thereto, according to an example embodiment.

FIG. 11 is top view of the insulative blanket having an extension attached thereto, according to an example embodiment. The insulative blanket 200 can also be thought of as a floor mat which is dimensioned to have a greater width and depth than a dock plate 132 associated with a dock leveler system 130. The floor mat 200 includes an insulative material, a grip enhancing material 510 on the surface of the floor mat (see FIG. 5) for contacting a dock plate and a floor area 121 near the dock plate 132, and a sign 230 on a visible surface of the floormat 200. The floormat 200 can also include a thermochromatic material 350 (see FIG. 3) that changes colors in response to temperature ranges. In some embodiments, at least one edge of the floor mat includes a portion for fastening the at least one edge 220 to another object. The floor mat can also have features on two edges 220, 224 for fastening to another object. The floor mat can also include at least one sensor 410. The sensor can be a load sensor 412 or a temperature sensor 414. The floor mat could also include at least one magnet 420 (see FIG. 4). The floor mat can also include at least one extension portion 1110 for increasing the dimensions of the floor mat 200. The extension 1110 will attach to the perimeter portion 220, 222, 224, 226 of the floormat 200. It is contemplated that each edge 220, 222, 224, 226 of the floor mat could include an extension 1110. In another embodiment, the insulative blanket 200 can also be extended by attaching an insulative blanket extension 1110 to the perimeter portions 222, 224, 226 which are not already attached to the door 110.

Figure 12:
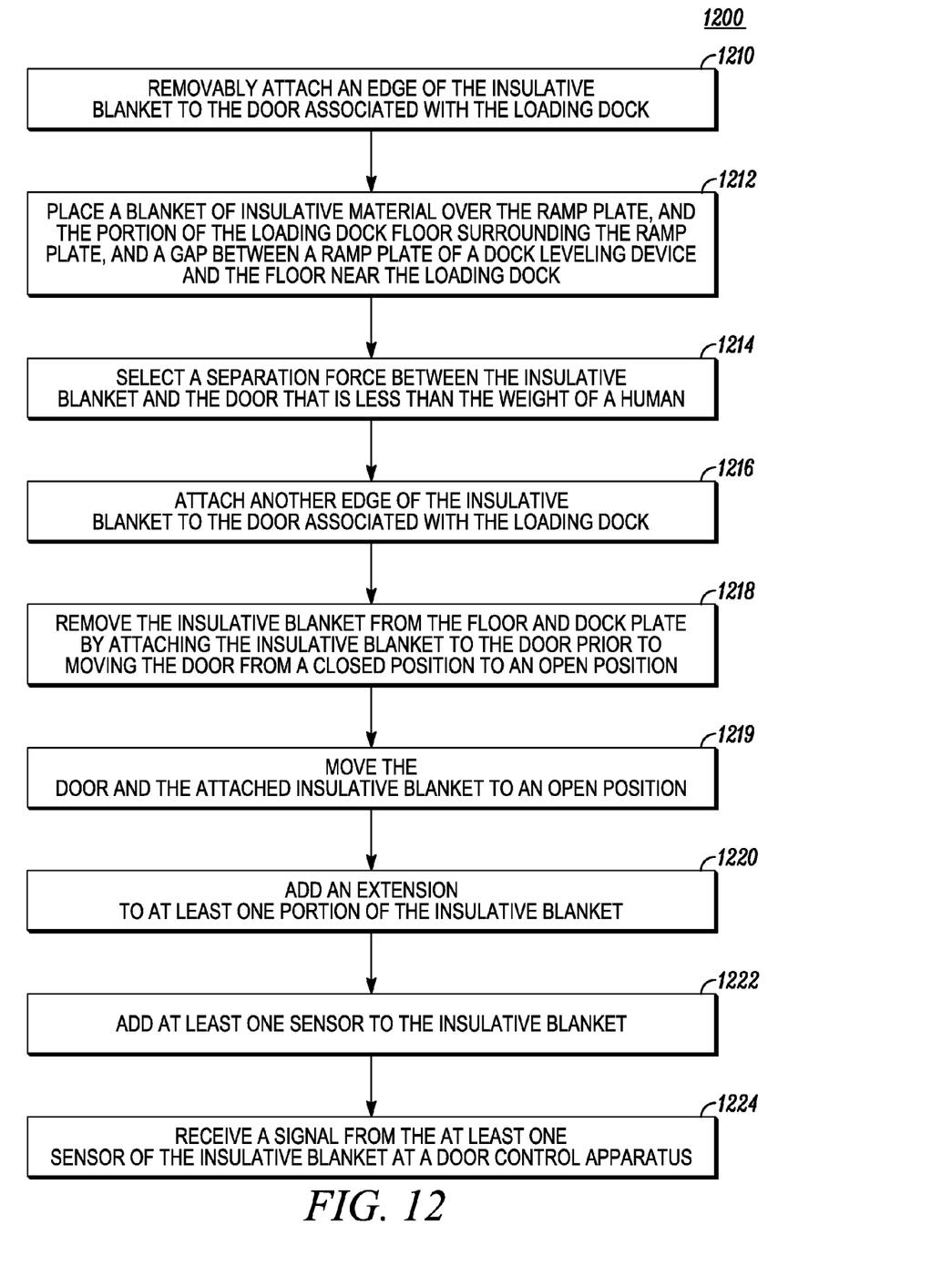
FIG. 12 is flow chart of a method of insulating a loading dock, according to an example embodiment.

FIG. 12 is flow chart of a method 1200 of insulating a loading dock, according to an example embodiment. The method 1200 for insulating a loading dock with a door and a dock leveling system includes removably attaching an edge of the insulative blanket to the door associated with the loading dock 1210, and placing a blanket of insulative material over the ramp plate, and the portion of the loading dock floor surrounding the ramp plate, and a gap between a ramp plate of a dock leveling device and the floor near the loading dock 1212. The insulative blanket is sufficiently heavy, in one embodiment, to inhibit the convection of air through the gap between the ramp plate and the floor near the floor near the loading dock The method also can include selecting a separation force between the insulative blanket and the door that is less than the weight of a human 1214. The method 1200 also includes attaching another edge of the insulative blanket to the door associated with the loading dock 1216. The method 1200 also includes removing the insulative blanket from the floor and dock plate by attaching the insulative blanket to the door prior to moving the door from a closed position to an open position 1218. Attaching the insulative blanket to the door further insulates the door. The method 1200 also includes moving the door and the attached insulative blanket to an open position 1219 where both the insulative blanket and the door are out of the way during loading or unloading of a truck or similar delivery vehicle. The method 1200 can also include adding an extension to at least one portion of the insulative blanket 1220. The method 1200 also includes adding at least one sensor to the insulative blanket 1222. The sensor can produce a signal. In one embodiment, the signal is received from the at least one sensor of the insulative blanket at a door control apparatus 1224. For example, the sensor may be a load sensor and the signal is indicative of a load being on the insulative blanket. The signal, in this case, would inhibit opening of the door at the door controller when a selected load is present on the insulative blanket.

Although a few variations have been described and illustrated in detail above, it should be understood that other modifications are possible. In addition it should be understood that the logic flow depicted in the accompanying figures and described herein do not require the particular order shown, or sequential order, to achieve desirable results. Other embodiments may be within the scope of the following claims.

The foregoing discussion discloses and describes merely exemplary embodiments of the present inventions. Upon review of the specification, one skilled in the art will readily recognize from such discussion, and from the accompanying figures and claims, that various changes, modifications and variations can be made therein without departing from the spirit and scope of the invention as defined in the following claims.

What is claimed is:

1. A thermal barrier system for a dock leveling system, comprising:
    a ramp plate associated with the dock leveling system, the ramp plate substantially flush to a floor of a storage facility when in a stowed position;
    a door near the dock leveling system, the door further having a closed position and an open position, the door in the closed position when not in use and liftable to the open position over the dock leveling system when using the dock leveling system;
    an insulative blanket, the insulative blanket dimensioned to be larger than the ramp plate, the insulative blanket covering the ramp plate and a gap between the ramp plate and the floor of the storage facility near a depression in which the dock leveling system is housed, the insulative blanket removably attached to at least a portion of the door when positioned over the ramp plate such that the insulative blanket automatically disengages from the door without damaging either the insulative blanket or the door when a weight over a weight threshold is present on the blanket as the door is lifted to the open position, wherein the insulative blanket is removably attached to the door adjacent a bottom edge of the door to define a first point of attachment between the insulative blanket and the door; and
    at least one hook attached directly to the door, wherein the hook is positioned a distance above the bottom edge of the door and a portion of the insulative blanket displaced from an edge removably attached to the door includes at least a first opening dimensioned to receive the hook to provide a second point of attachment of the insulative blanket to the door that positions a portion of the insulative blanket adjacent the door at a different height than the first point of attachment for lifting the door to the open position.

2. The thermal barrier system of claim 1 further comprising a hook and loop fastener that removably attaches the insulative blanket to the door, one portion of the hook and loop fastener attached to the door and another portion of the hook and loop fastener attached to an edge of the insulative blanket.

3. The thermal barrier system of claim 2 wherein the portions of the hook and loop fastener separate from one another when the predetermined weight over the weight threshold is positioned on the insulative blanket as the door is lifted to the open position.

4. The thermal barrier system of claim 1 further comprising at least one magnet attached to one of the door and the blanket edge, and at least one portion of ferrous material attached to the other of the door and blanket edge to removably attach the insulative blanket to the door.

5. The thermal barrier system of claim 1 further comprising signage on a visible portion of the insulative blanket.

6. The thermal barrier system of claim 1 wherein the insulative blanket further comprises a thermo chromic material.

7. The thermal barrier system of claim 1 further comprising at least one sensor associated with the insulative blanket.

8. The thermal barrier system of claim 7 wherein the at least one sensor is a load sensor.

9. The thermal barrier system of claim 7 wherein the at least one sensor is a temperature sensor.

10. The thermal barrier system of claim 7 wherein the at least one sensor sends a signal to a controller for the door.

11. The thermal barrier system of claim 1 wherein a perimeter of the insulative blanket includes a grip enhancing material on the surface of the insulative blanket that contacts the dock plate and the floor near the dock plate.

12. The thermal barrier system of claim 1 wherein at least a portion of a perimeter of the insulative blanket includes a weight, such that the at least a portion of the perimeter is heavier than an interior portion of the blanket.

13. The thermal barrier system of claim 1 further comprising an insulative blanket retraction apparatus.

14. The thermal barrier system of claim 1 wherein at least one edge of the insulative blanket has a perimeter portion that is wider than perimeter portions of other edges of the insulative blanket.

15. The thermal barrier system of claim 1 wherein the blanket warms the environment proximate the blanket when in the deployed position.

16. The thermal barrier system of claim 1, wherein a midpoint in the blanket is defined between the edge of the blanket removably attached to the door and an opposite edge positioned away from the door, and wherein the opening in the blanket is positioned at the midpoint or closer to the opposite edge than the edge that is removably attached to the door.

17. The thermal barrier system of claim 14, wherein the perimeter portion of the insulative blanket that is wider than the perimeter portions of other edges of the insulative blanket is removably attached to at least a portion of the door when the insulative blanket is positioned over the ramp plate.

* * * * *